US005381215A

United States Patent [19]

Haneda et al.

[11] Patent Number: 5,381,215

[45] Date of Patent: Jan. 10, 1995

[54] IMAGE FORMING APPARATUS HAVING CHARGER TO CHARGE IMAGE CARRIER WITH MAGNETIC BRUSH

[75] Inventors: Satoshi Haneda; Kunio Shigeta; Sachie Hosokoezawa; Masakazu Fukuchi; Shizuo Morita; Hiroyuki Nomori, all of Hachioji, Japan

[73] Assignee: Konica Corporation, Tokyo, Japan

[21] Appl. No.: 134,985

[22] Filed: Oct. 12, 1993

[30] Foreign Application Priority Data

Oct. 15, 1992 [JP] Japan .................................. 4-277370
Oct. 15, 1992 [JP] Japan .................................. 4-277371
Dec. 7, 1992 [JP] Japan .................................. 4-326819

[51] Int. Cl.$^6$ .............................................. G03B 15/02
[52] U.S. Cl. ..................................... 355/219; 361/225
[58] Field of Search ................ 355/219; 361/225, 230, 361/233, 235, 221

[56] References Cited

U.S. PATENT DOCUMENTS 4,174,903 11/1979 Snelling .
4,706,320 11/1987 Swift .
5,060,016 10/1991 Wanou et al. ........................ 355/219
5,225,878 7/1993 Asano et al. ......................... 355/219
5,287,146 2/1994 Uno et al. ........................... 355/219

FOREIGN PATENT DOCUMENTS 0308185 3/1989 European Pat. Off. .
0474220 3/1992 European Pat. Off. .
57-192971 11/1982 Japan .
59-133569 11/1984 Japan .
63-187267 8/1988 Japan .
4-021873 1/1992 Japan .
4-116674 4/1992 Japan .
5-100545 4/1993 Japan .
5-127490 5/1993 Japan .
5-134517 5/1993 Japan .

OTHER PUBLICATIONS

Journal of Applied Physics, vol. 62, No. 7, Oct. 1, 1987, pp. 2665–2668, Tetsutani and Hoshino, "New Photoreceptor Charging Method by Rubbing with Magnetic Conductive Particles", New York, U.S.A.

*Primary Examiner*—R. L. Moses
*Attorney, Agent, or Firm*—Frishauf, Holtz, Goodman & Woodward

[57] ABSTRACT

A device for charging a photoreceptor on which a toner image is formed, comprises a rotatable sleeve, at least two magnets disposed in the sleeve so as to attract magnetic particles in a form of magnetic brush, and a electric power source to provide the photoreceptor with an electric charge through the magnetic brush. One of the magnets is disposed upstream of the closest point between the photoreceptor and the sleeve, and the other magnet is disposed downstream of the closest point.

7 Claims, 7 Drawing Sheets

IMAGE FORMING APPARATUS HAVING CHARGER TO CHARGE IMAGE CARRIER WITH MAGNETIC BRUSH

BACKGROUND OF THE INVENTION

The present invention relates to an image forming apparatus employing an electrostatic transfer process such as an electrophotographic copying machine and an electrostatic recording apparatus.

For charging an image forming member such as a photoreceptor drum, generally a corona charger has hitherto been used wherein high voltage is impressed upon a discharge wire and thereby a strong electric field is generated around the discharge wire for gaseous discharge. The image forming member is charged when electric charge ions generated in the process of gaseous discharge are adsorbed on the image forming member.

A corona charger used in the conventional image forming apparatus mentioned above has an advantage that an image forming member is not damaged in the process of charging thereon because the charger does not come into mechanical contact with the image forming member. The corona charger, however, has a disadvantage, due to high voltage used therein, that there is a risk of an electric shock or electric leakage and also ozone generated in the course of gaseous discharge is harmful to human bodies and the ozone shortens a life of the image forming member. Further, charging voltage by means of a corona charger is sharply influenced by temperature and humidity to be unstable, and noise is caused by high voltage in the corona charger, which is a serious disadvantage on the occasion where an electrophotographic image forming apparatus is utilized as a terminal unit for communication or an information processing apparatus.

These many disadvantages of a corona charger are caused by gaseous discharge necessary for charging.

Therefore, there are disclosed in Japanese Patent Publication Open to Public Inspection Nos. 133569/1984, 21873/1992 and 116674/1992 (hereinafter referred to as Japanese Patent O.P.I. Publication) the charging devices wherein magnetic particles are adsorbed on a cylindrical conveying carrier which is a charging roller holding therein magnetic objects for forming a magnetic brush, and the magnetic brush rubs the surface of the image forming member for charging it, as a charging device capable of charging the image forming member without conducting high voltage gaseous discharge carried out in a corona discharge and without giving any mechanical damages on the image forming member.

However, even the charging devices disclosed in the aforementioned Japanese Patent O.P.I. Publications have a problem in which an image forming member can not be charged uniformly, completely and stably. The problem will be described as follows:

In the transfer region, magnetic particles on the surface of the cylindrical magnetic particle conveying carrier are formed into a chain shape, and charging is conducted through this chain-shaped magnetic brush. Therefore, the image forming member is locally overcharged, and dielectric breakdown and uneven charging are caused on the image forming member.

As a specific example, charging is conducted through this magnetic brush. In this case, at a position where the magnetic particle conveying carrier and the image forming member are located most closely, the magnetic particles are compressed, so that the resistance of the magnetic brush is lowered. Accordingly, a current flows at a position on the image forming member where the resistance is low, so that the voltage of the entire magnetic brush is lowered.

Consequently, because of a spot-shaped defective portion **10*d* shown in FIG. 7, an entire stripe-shaped region R on the image forming member 10** where the magnetic brush comes into contact is defectively discharged, and in some cases, the power source for bias voltage is damaged.

SUMMARY OF THE INVENTION

In order to solve the above problems, it is an object of the present invention to provide an image forming apparatus in which neither the dielectric breakdown of an image forming member nor the generation of ozone is caused and extremely stable and uniform charging can be conducted.

The above object can be accomplished by an image forming apparatus in which magnetic particles are supplied onto a conveying carrier to form a magnetic brush, and the magnetic brush is positioned under an oscillating electrical field so as to electrically charge an image forming member having a looped imaging surface, the image forming apparatus characterized in that: a fixed magnet is provided inside the conveying carrier; in the magnet, different magnetic poles are disposed on both sides of a position where the conveying carrier and the image forming member are most closely located; and a horizontal magnetic field is formed in parallel with a tangential direction of the circumferential surface of the image forming member in the charging section.

In a preferable embodiment of the present invention, the different magnetic poles are disposed on both sides of a position where the conveying carrier and the image forming member are most closely located, wherein an angle formed between the aforementioned position and the magnetic pole is 5° to 45°.

According to the present invention, the different magnetic poles inside the magnetic particle conveying carrier of the charging unit are located on both sides of the position where the image forming member and the conveying carrier are most closely arranged so as to form a horizontal magnetic field. Accordingly, the bristles of the magnetic brush are formed in parallel with the circumferential surface of the image forming member in the charging section.

The above object can be accomplished by an image forming apparatus in which magnetic particles are supplied onto a conveying carrier to form a magnetic brush, and the magnetic brush is positioned under an oscillating electrical field so as to electrically charge an image forming member, the image forming apparatus characterized i that: a fixed magnet is provided inside the conveying carrier; a magnetic pole of the magnet is opposed to an upper stream portion of the image forming member; and the inequality $H\gamma > H\theta$ is satisfied, wherein the magnetic intensity of the conveying carrier in the tangential direction is $H\theta$ and the magnetic intensity in the vertical direction is $H\gamma$.

One of the preferable embodiment of the image forming apparatus of the present invention is as follows. A position where the magnetic pole is set is separate from the position where the conveying carrier and the image forming member are most closely located, by an angle of 5° to 15°, and a relation between Hθ and Hγ is 0.1Hγ≦Hθ≦0.5Hγ.

In the image forming apparatus of the present invention, the magnetic pole of the magnet provided inside of the magnetic particle conveying carrier of the charging unit is disposed in the upstream of the position where the image forming member and the conveying carrier are most closely located, so that the magnetic intensity in the charging section is provided with a component of the tangential direction of the conveying carrier. Accordingly, the bristles of the chain-shaped magnetic particles are laid in the charging section.

DETAILED DESCRIPTION OF THE PREFERRED EMBODIMENTS

Figure 1:
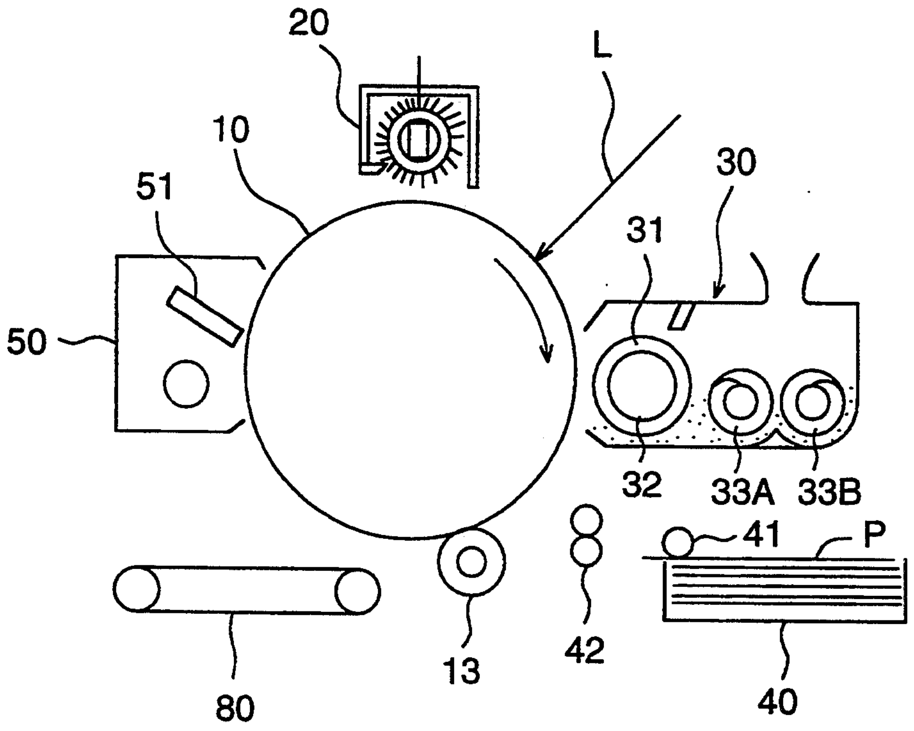
FIG. 1 is a schematic view showing the outline of the structure of an image forming apparatus of the invention.

Before explaining examples of the invention, the particle size of magnetic particles and conditions of a charging roller will be explained as follows.

Generally, when an average particle size weighted mean of magnetic particles is large, a magnetic brush formed on a charging roller shows its coarse structure. Therefore, even when charging while giving vibration with an electric field, the magnetic brush tends to show unevenness, resulting in a problem of uneven charging. In order to solve the problem, an average particle size of magnetic particles is required to be small, and results of experiments have shown that the average particle size of not more than 150 μm starts indicating its effect, and that of not more than 100 μm does not cause the problem mentioned above substantially. However, when particles are too small, they stick to the surface of an image forming member during the course of charging, or they easily scatter. These phenomena are observed remarkably in general when an average particle size (weighted means) is not more than 15 μm, though the phenomena depend on the intensity of a magnetic field, or then intensity of magnetization of particles caused by the intensity of the magnetic field. In this connection, the intensity of magnetization ranging from 20 emu/g to 200 emu/g is preferably used.

With regard to the particle size of a magnetic particle, the foregoing shows that the average particle size weighted mean of not more than 150 μm and not less than 15 μm is preferable and that of not more than 100 μm and not less than 30 μm is especially preferable.

The magnetic particles as those mentioned above are obtained by selecting particle sizes through the average particle size selecting means known widely in the past from the particles of ferromagnetic substance such as metal including iron, chromium, nickel or cobalt identical to those in magnetic carrier particles in the conventional two-component developer, or such as a compound or an alloy thereof including, for example, triiron tetroxide, r-ferric oxide, chromium dioxide, manganese oxide, ferrite, or manganese-copper alloy, or from the particles obtained either by covering the surface of the ferromagnetic substance particle mentioned above with resins such as styrene resin, vinyl resin, ethylene resin, rosin-denatured resin, acrylic resin, polyamide resin, repoxy resin or polyester resin, or by preparing with resins containing dispersed magnetic substance fine particles.

A magnetic particle formed to be spherical offers an effect that a uniform particle layer can be formed on a charging roller and high bias voltage can be impressed uniformly on the charging roller. Namely, the magnetic particle formed to be spherical offers the following two effects: (1) though a magnetic particle tends to be adsorbed magnetically in its major axis direction, the spherical particle does not have any tendency in terms of direction of magnetic adsorption, and thereby a layer can be formed uniformly and occurrence of an area where the resistance is locally lower and unevenness of the layer thickness can be prevented, and (2) resistance of a magnetic particle is enhanced and the particle loses its edge portion observed on a conventional particle, thereby electric fields are not concentrated on the edge portion, resulting in uniform discharging on an image forming member and no occurrence of uneven charging despite impression of high bias voltage on a magnetic particle charging roller.

As the spherical particles exhibiting the effects mentioned above, those wherein conductive magnetic particles are formed so that electrical resistivity may show the value of not less than $10^3$ Ω.cm and not more than $10^{12}$ Ω.cm, especially the value of not less than $10^4$ Ω.cm and not more than $10^9$ Ω.cm are preferable. This electrical resistivity represents a value obtained by reading a value of an electric current when particles are put in a container having a cross-sectional area of 0.50 $cm^2$, then are tapped, load of 1 $kg/cm^2$ is applied on the crammed particles and voltage is impressed between the load and an electrode on the bottom of the container so that an electric field of 1,000 V/cm may be formed. Under the condition of low electrical resistivity, when bias voltage is impressed on a charging roller, electric charges are injected in magnetic particles and thereby the magnetic particles tend to stick to the charging roller, or dielectric breakdown of an image forming member caused by bias voltage tends to take place. When the electrical resistivity is high, on the contrary, no electric charges are injected and no charging is made accordingly.

With regard to magnetic particles used in the invention, the preferable ones have small specific gravity and appropriate maximum magnetization so that a magnetic brush composed of the magnetic particles may move lightly owing to an alternating electric field and yet no scattering of the magnetic particles may occur. It has been found out that the magnetic particles whose true specific gravity is not more than 6 and maximum magnetization is 30–100 emu/g produce good results actually.

Putting the foregoing together, optimum conditions of the magnetic particles include that a particle is made globular so that the ratio of the major axis to the minor axis of the particle is not more than 3, a needle-shaped portion and an edge portion of the particle have no protrusions and electrical resistivity is preferably not less than $10^4$ Ω.cm and not more than $10^9$ Ω.cm. The magnetic particles having the optimum conditions mentioned above can be manufactured by selecting the spherical particles to the utmost, and by providing a spheroidizing process after formation of dispersed resin particles by using magnetic substance fine particles to the utmost in the case of particles wherein magnetic substance fine particles are dispersed, or by forming dispersed resin particles through the method of spray drying.

Further, when toner is mixed in a magnetic brush, charging efficiency is lowered and thereby uneven charging takes place because insulating power of the toner is high. For avoiding this problem, it is necessary to reduce an amount of charges on the toner so that the toner may move to an image forming member in the course of charging. It was possible to prevent toner accumulation on a magnetic brush when an amount of frictional electrification of toner was made to be 1–20 μC/g in the same charging polarity under the condition that toner was mixed with magnetic particles and adjusted to the toner concentration of 1%. It is considered that the reason for the above is that the toner, even when it is mixed, sticks to a photoreceptor in the course of charging. It was confirmed that when an amount of charges of toner is large, it is difficult for the toner to leave magnetic particles, while when that is small, it is difficult to move electrically to an image forming member.

The foregoing represents the conditions of magnetic particles, and conditions of magnetic particles forming a particle layer and thereby charging an image forming member in relation to a charging roller will be explained as follows.

With regard to a charging roller for magnetic particles, a conductive charging roller capable of being impressed with bias voltage is used, and especially, the one wherein a magnetic object having plural magnetic poles is provided inside a conductive charging roller having on its surface a particle layer, is preferably used. In such charging roller as mentioned above, fresh magnetic particles are supplied in succession because a particle layer formed on the surface of the conductive charging roller due to the relative rotation to the magnetic object moves with a wavy movement, and even when slight unevenness in thickness of a layer exists in a particle layer on the surface of the charging roller, the effect of the unevenness can be offset sufficiently by the wavy movement mentioned above so that no problem may be caused practically. The conveyance speed for magnetic particles caused by a rotation of the charging roller may be slower than the moving speed of an image forming member, but it is preferable that the conveyance speed is either equivalent mostly to or higher than the moving speed of an image forming member. With regard to the conveyance direction caused by a rotation of the charging carrier, the same direction is preferable. The uniform charging under the condition of the same direction is superior to that under the condition of the opposite direction. However, it should be understood that the present invention is not limited to that.

With regard to the surface of a charging roller, mean roughness of 2–15 μm is preferable for stable and uniform conveyance of magnetic particles. When the surface is too smooth, magnetic particles can not be conveyed sufficiently and when it is too rough, excess current flows from the protrusion on the surface. In any case, sand blasting process that tends to cause uneven charging is preferably used.

Further, it is preferable that the thickness of a particle layer formed on a charging roller is uniform by the action of the regulating plate. When an amount of magnetic particles existing in a charging area on the surface of the charging roller is large, the magnetic particles can not be vibrated sufficiently, causing abrasion of a photoreceptor and uneven charging, and excess current tends to flow while the torque for driving the charging roller is increased, which is a disadvantage. When an amount of magnetic particles existing in a charging area on the surface of the charging roller is small, on the contrary, a portion of imperfect contact with an image forming member is created, causing magnetic particles to stick to the image forming member and uneven charging to take place. It was found out, after some experiments, that the preferable amount W of magnetic particles existing in the charging area is 10–300 mg/cm$^2$ and the more preferable is 30–150 mg/cm$^2$. Incidentally, this existing amount represents a mean value in the contact area of a magnetic brush.

The distance D between a charging roller and an image forming member which is 100–10000 μm is preferable, and the more preferable is 200–5000 μm. When the distance D between a charging roller and an image forming member is smaller than 200 μm, it is difficult to form an ear of a magnetic brush that conducts uniform charging operation for the distance, and it is impossible to supply sufficient magnetic particles to the charging section, making it impossible to charge stably. When the distance D exceeds 5000 μm by far, a particle layer is formed coarsely, causing uneven charging to take place easily and causing sufficient charging not to be obtained by reducing the charge injection efficiency. When the distance D between a charging roller and an image forming member takes an extreme value as shown above, the thickness of a particle layer on the charging roller can not be adjusted to the appropriate value for the distance. When the distance D is in the range of 200–5000 μm, however, it is possible to make the thickness of a particle layer to be appropriate for the distance so that occurrence of comet caused by rubbing of a magnetic brush may be prevented. It was further clarified that most preferable conditions exist between the appropriate conveyance amount (W) and distance (D).

Conditions of $300 \leqq W/D \leqq 3{,}000$ (mg/cm$^3$) were important for charging uniformly, at high speed and stably. When the value of W/D was out of this range, it was confirmed that uneven charging took place.

A diameter of the charging roller ranging from 5 mm φ to 20 mm φ is preferable. With the diameter in that range, it is possible to secure a contact area necessary for charging. When the contact area is larger than that is needed, charging current is increased to be excessive, while when it is smaller than is needed, uneven charging tends to occur. In the case where the diameter of the conveying carrier is small as described above, magnetic particles tend to scatter by the action of centrifugal force so that they are attached to the surface of the image forming member. For this reason, it is preferable that the linear speed of the conveying carrier is reduced.

D is considered to be a factor for determining the length of a chain of magnetic particles. Electric resistance corresponding to the length of the chain is considered to correspond to easiness of charging and charging speed. On the other hand, W is considered to be a factor determining the density of chains of magnetic particles. It is considered that an increase of the number of chains improves uniformity of charging. In a charging area, however, it is considered that compressed state of chains of magnetic particles is realized when the magnetic particles pass through a narrow gap. In this case, the chains of magnetic particles rub an image forming member while the chains contact each other to be bent and disturbed.

The disturbing conditions are considered to cause no charging streaks and to make the movement of charges easy, thereby to be effective for uniform charging. Namely, when the value of W/D corresponding to magnetic particles density is small, chains of magnetic particles are coarse to receive less disturbance, resulting in uneven charging. When the value of W/D is large, chains of magnetic particles are not formed sufficiently due to the high compression, and magnetic particles are less disturbed. This prevents the free movement of charges and is considered to be the reason for uneven charging.

Incidentally, when the conveyance amount W is smaller than 10 mg/cm$^2$, sticking of magnetic particles and uneven charging are caused, while when W is larger than 300 mg/cm$^2$, abrasion of a photoreceptor and uneven charging are caused, both of the foregoing failed to offer preferable results. The preferable range between the both cases above was 30–150 mg/cm$^2$.

Further, it was clarified that the more preferable uniform charging free from sticking of magnetic particles and uneven charging can be obtained when W/D is set, under the aforementioned condition of conveyance amount, to the conditions of 300 mg/cm$^3$<W/D<3,000 mg/cm$^3$ wherein the distance between an image forming member and a charging roller of magnetic particles is defined to be D (cm). When the value of W/D was made smaller than 300 mg/cm$^3$, or larger than 3,000 mg/cm$^3$, there were observed phenomena including sticking of magnetic particles and occurrence of uneven charging.

From the foregoing, preferable conditions are as follows: a magnetic brush composed of a layer of magnetic particles sticking to a charging roller for magnetic particles having magnetic force is brought into contact with a moving image forming member, a bias electric field is formed between the charging roller and the image forming member, and thereby an alternating electric field is used for the bias electric field, the magnetic brush is formed so that an existing amount of magnetic particles at a charging area may be 10–300 mg/cm$^2$ and further the conditions of $300 \leqq W/D \leqq 3{,}000$ (mg/cm$^3$) wherein D (cm) represents the distance between the charging roller for magnetic particles and the image forming member are satisfied, in a charging device for charging an image forming member.

In the case of an image forming method in which the aforementioned charging device is used as a cleaning device, it is preferable to employ reversal development compared with normal development, because toner can be easily discharged from the charging device, and the polarity of the discharged toner becomes the same in the case of reversal development, and when the toner is recovered by the action of development bias voltage, the occurrence of fog in an image can be prevented.

EXAMPLES

Examples of the invention will be explained as follows, referring to the drawings.

FIG. 1 is a sectional view showing the outline of the structure of an electrostatic recording apparatus that is an image forming apparatus of the invention. In the figure, the numeral 10 represents an image forming member that rotates in the arrowed direction (clockwise), namely a photoreceptor drum composed of OPC charged negatively. Around the circumference surface of the photoreceptor drum, there are provided charging device 20 which will be described later, an exposure unit where image light L from an exposure device enters, developing unit 30, transfer roller 13 and cleaning unit 50.

In the basic operation of a copy process of the present example, when a command to start copying is sent from an unillustrated operation panel to an unillustrated control unit, photoreceptor drum 10 starts rotating in the arrowed direction, being controlled by the control unit. When the photoreceptor drum 10 rotates, the circumference surface thereof passes through charging device 20 described later to be charged uniformly. On the surface of the photoreceptor drum 10, there is written an image with image light L, such as a laser beam, for example, from an image writing device, thus, an electrostatic latent image corresponding to the image is formed.

In developing unit 30, there are contained two-component developers which are stirred by stirring screws 33A and 33B and then adhere to the external surface of developing sleeve 31 which is positioned to cover magnetic object roller 32 and rotates to form a magnetic brush of developers. On the developing sleeve 31, there is impressed predetermined bias voltage so that reversal development may be conducted at the developing area facing the photoreceptor drum 10.

Recording sheets P are fed out from sheet-feeding cassette 40 by first sheet-feeding roller 41 one sheet by one sheet. The recording sheet P thus fed out is sent onto photoreceptor drum 10 by second sheet-feeding roller 42 that operates in synchronization with the aforementioned toner image on the photoreceptor drum 10. Then, the toner image on the photoreceptor drum 10 is separated from the photoreceptor drum 10 and transferred onto the recording sheet P through the operation of transfer roller 13. The recording sheet P onto which the toner image has been transferred is sent, through conveyance means 80, to an unillustrated fixing unit where the recording sheet is sandwiched between a heat-fixing roller and a pressure roller to be fixed, and then is ejected to the outside of an apparatus. The surface of the photoreceptor drum 10 having thereon toner which stays there without being transferred onto the recording sheet P is scraped by cleaning unit 50 equipped with blade 51 or the like for cleaning to be standing by ready for the following copying.

Figure 2:
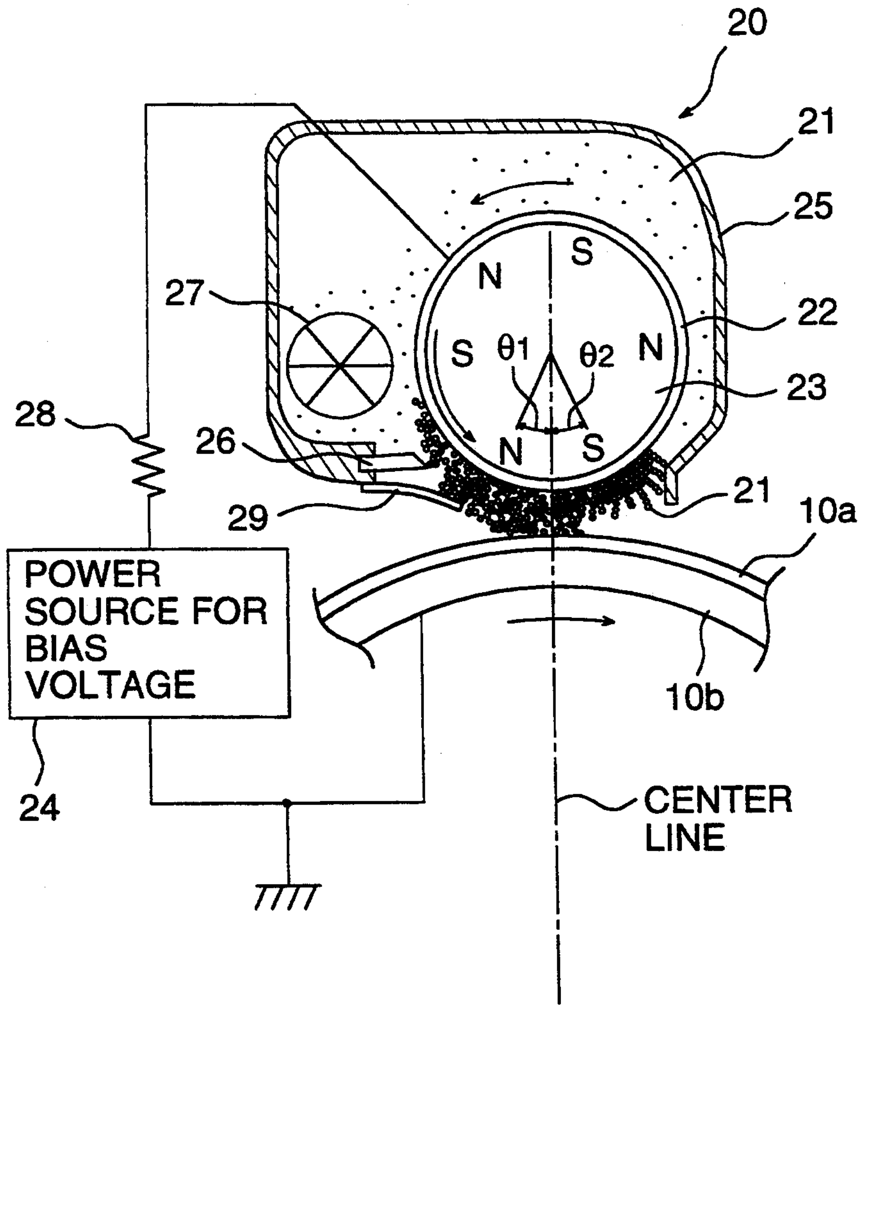
FIG. 2 is a schematic view showing an example of the charging device in FIG. 1.

FIG. 2 represents a sectional view showing an example of charging device 20 used for the image forming apparatus in FIG. 1. In the figure, the numeral 21 represents magnetic particles, 22 represents a charging roller that is a carrier for conveying magnetic particles 21 formed with non-magnetic and conductive metal such as, for example, aluminum, and 23 represents a columnar magnetic object affixed inside the charging roller 22. Around the circumference of the columnar magnetic object 23, there are arranged south poles and north poles as shown in the figure so that the surface of the charging roller 22 may show 500–1,000 gauss, thereby the columnar magnetic object is magnetized. The diameter of the charging roller 22 is 5–30 mmϕ, and the charging roller 22 can be rotated with respect to the magnet 23. The charging roller 22 is disposed in such a manner that a gap between the charging roller 22 and the photoreceptor drum 10 is formed to be 0.5–1.0 mm. The charging roller 22 is rotated in the same direction as that of the photoreceptor drum 10 at a circumferential speed 1.2–2.0 times higher than that of the photoreceptor drum.

The positions of two different magnetic poles of the magnet 23, which are located most closely to the photoreceptor drum 10, are on both sides of the position where the charging roller 22 and the photoreceptor drum 10 are arranged most closely, that is, the two different magnetic poles of the magnet 23 are located on both sides of the center line connecting the center of the photoreceptor drum 10 with that of the charging roller 22. As a result of the experiment, the following has been found:

Angles $\theta_1$ and $\theta_2$ formed between the lines connecting the center of the charging roller 22 with the two magnetic poles, and the center line connecting the center of the charging roller 22 with the photoreceptor drum 10, are preferably 5°–45°. The polarity of the different two magnetic poles is not particularly limited, that is, either of the two different poles may be N or S. Concerning the angles $\theta 1$ and $\theta 2$, it is more preferable that $\theta 1 \geqq \theta 2$. Due to the foregoing, the contacting portion in the upstream can be extended, and a strong magnetic field can be formed in the downstream. When charging is conducted under the aforementioned condition, deposition of magnetic particles can be advantageously prevented.

As a result of the foregoing, the direction of the magnetic lines in the charging section becomes parallel with the tangential direction of the photoreceptor drum 10. This magnetic field will be referred to as a horizontal magnetic field, hereinafter.

The photoreceptor drum 10 consists of conductive base **10*b* and photoreceptor layer 10*a* that covers the conductive base 10*b*** which is grounded.

The numeral 24 is a bias power source that applies bias voltage between the charging roller 22 mentioned above and the conductive base **10*b*, and the charging roller 22 is grounded through the bias power source 24**.

The bias power source 24 is a power source to supply A.C. bias voltage wherein A.C. components are superposed on D.C. components set to the same value as that of voltage used for charging. D is kept within 0.1–5 mm though it depends on the dimension of the distance D between the charging roller 22 and the photoreceptor drum 10 and on charging voltage with which the photoreceptor drum 10 is charged. It was possible to obtain preferable charging conditions by supplying, through protective resistance 28, the A.C. bias voltage wherein A.C. components of 200–3,500V are superposed, as peak-to-peak voltage (Vp-p), on D.C. components of −500V–−1,000V which are mostly the same as voltage for charging. Incidentally, in the bias power source 24, D.C. components are subjected to constant-voltage control, while A.C. components are subjected to constant-current control.

Numeral 25 is a casing to form a storing section of the magnetic particles. The charging roller 22 and the magnet 23 are disposed in the casing 25. The regulating plate 26 is provided at the outlet of the casing 25, so that the thickness of the magnetic particle layer 21 conveyed by the charging roller 22 can be regulated. A gap formed between the regulating plate 26 and the charging roller 22 is adjusted so that a conveyance amount of the magnetic particles 21, that is, an amount of the magnetic particles 21 on the charging roller 22 in the developing region can be 10–300 mg/cm$^2$, and preferably 30–150 mg/cm$^2$. A leveling plate 29 made of insulating resilient material is provided at a position on the upstream side of the charging section so that the layer of the magnetic particles 21 can be pressed against the charging roller 22. The layer of the magnetic particles 21 is leveled at a position immediately before the charging section by the leveling plate 29 made of insulating resilient material such as urethane rubber. Therefore, streak-shaped unevenness harmful for the regulating plate 26 can be avoided, and a uniform thin layer is conveyed to the charging section. The photoreceptor drum 10 and the charging roller 22 are connected by a magnetic brush of the magnetic particles 21, the thickness of which is regulated, formed in the gap between the photoreceptor drum 10 and the charging roller 22. Numeral 27 is an agitator having a rotational body composed of a plate member rotated around a shaft so as to correct the deviation of the magnetic particles 21.

Operations of the charging device 20 described above will be explained as follows.

When the charging roller 22 is rotated in the arrowed direction at the speed ranging from 1.2 times to 2.0 times that of the peripheral speed of the photoreceptor drum 10, while the photoreceptor drum 10 is being rotated in the arrowed direction, layers of magnetic particles 21 attracted by lines of magnetic force of magnetic object 23 to and conveyed by the charging roller 22 are connected magnetically to the shape of a chain to be a sort of brush shape at the location on the charging roller 22 where the charging roller faces the photoreceptor drum, thus the so-called magnetic brush 21A is formed. The magnetic brush is conveyed in the direction of the rotation of the charging roller 22 to come in contact with photoreceptor layer **10*a* on the photoreceptor drum 10 to rub it. Since A.C. bias voltage mentioned above is impressed between the charging roller 22 and the photoreceptor drum 10, charges are given to the photoreceptor layer 10*a* to charge it through conductive magnetic particles 21. In this case, in particular, A.C. bias voltage is impressed for forming alternating electric field, and the different magnetic poles are disposed on both sides of the center line, that is, the different magnetic poles are disposed on the upper and lower stream sides being separated by an angle for 5°–45°. Therefore, in the charging section, a horizontal magnetic field is formed. Due to the foregoing, the bristles of the magnetic brush in which magnetic particles 21 are connected in a chain-shape are laid in the tangential direction of the circumference of the photoreceptor drum 10**. Therefore, the charging section can be extended, and the electrical charge injection efficiency of the magnetic brush can be improved. Accordingly, highly stable charging can be uniformly can be conducted.

Figure 3:
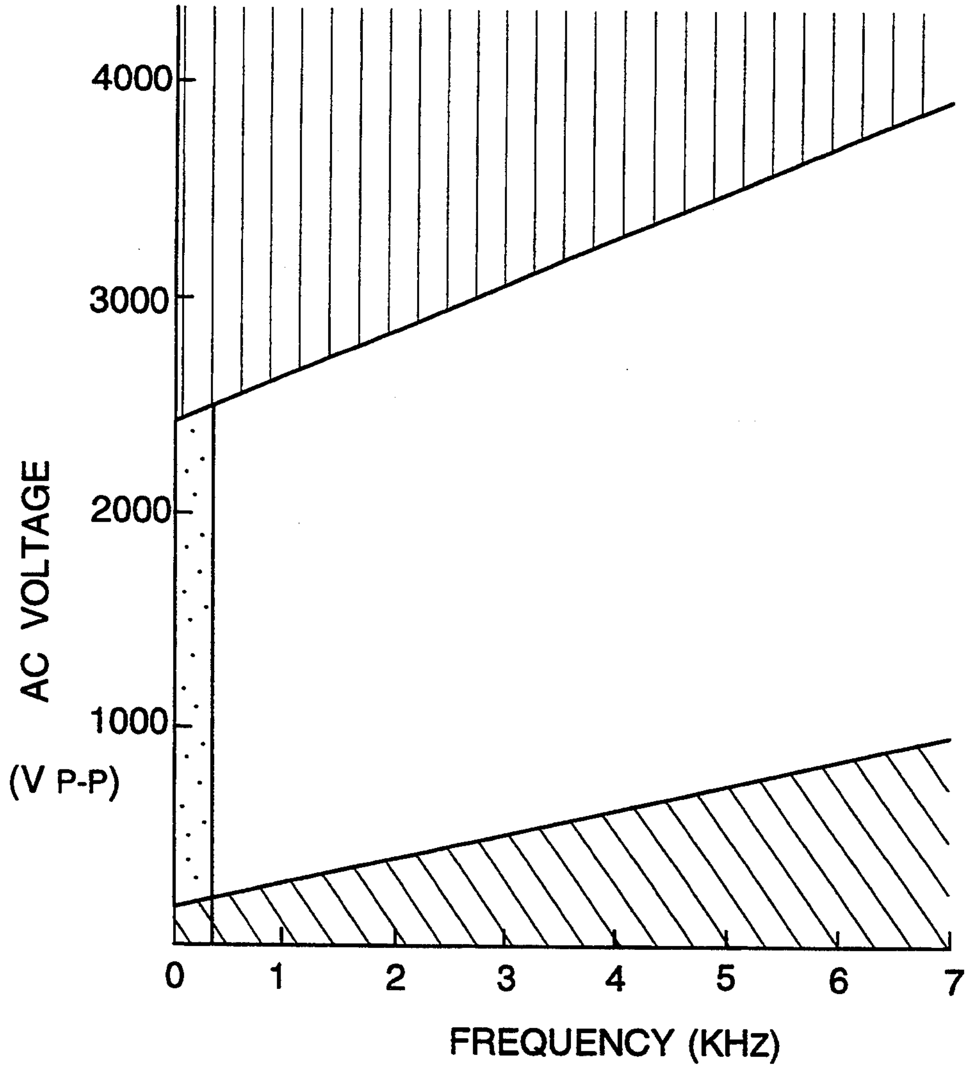
FIG. 3 is a diagram of charging characteristics for the variation of frequency and voltage in A.C. voltage component.

Incidentally, FIG. 3 shows the results of the above-mentioned example wherein both frequency and voltage of A.C. voltage components to be impressed on charging roller 22 were varied.

In FIG. 3, a portion hatched with vertical lines represents a zone where dielectric breakdown tends to take place, a portion hatched with slanting lines represents a zone where uneven charging tends to take place, and a portion which is not hatched represents a preferable zone where charging can be conducted stably. As is apparent from the figure, the preferable zone varies slightly depending on variation of A.C. voltage components. Incidentally, a waveform of A.C. voltage component may also be a square wave or a triangular wave, without being limited only to a sine wave. Further, in FIG. 3, a dotted area of low frequency is a zone where uneven charging is caused due to a low frequency.

Spherical ferrite particles coated to be conductive were used as magnetic particles 21 in the example mentioned above. In addition to that, it is also possible to use conductive magnetic resin particles obtained by crushing primary components of magnetic particles and resins together after thermal refining thereof. For excellent charging, each particle is required to be prepared to satisfy that the external shape of each particle is truly spherical, particle size is 50 $\mu$m, specific resistance is $10^3$ Ω.cm, and an amount of frictional electrification is $-5$ $\mu$C/g under the condition of toner concentration of 1%.

In this connection, it is further possible to neutralize photoreceptor drum 10 by the use of charging device 20 of the present example. Neutralizing can be carried out by bias voltage wherein only D.C. components are reduced to zero. After forming an image, an image forming member is rotated while it is being impressed with only A.C. components, thus, photoreceptor drum 10 can be neutralized.

In this connection, after a long term use, much toner staying on the surface of the photoreceptor drum 10 without being cleaned is mixed in a layer of magnetic particles 21. This sometimes causes the resistance of the magnetic brush to be enhanced, resulting in deteriorated charging efficiency. Due to the foregoing, it is possible to prevent the toner mixing by establishing the conditions under which toner tends to stick to photoreceptor drum 10, including setting to the high level the polarity of D.C. bias voltage to be impressed on charging roller 22 while the photoreceptor drum 10 is rotating before or after image forming, or setting the A.C. voltage to the high level. Especially in the case wherein the charged polarity on the photoreceptor drum 10 is identical to that of toner as in an image forming apparatus conducting reversal development, the polarity is the same as that of toner contained in developing unit 30. Therefore, contamination caused by toner tends not to occur, resulting in no appearance of fog on an image in the course of developing, proving to be an optimum combination.

In the invention, an image forming member is charged through a magnetic brush formed on a charging roller that injects charges directly into the image forming member. Therefore, it is possible to lower bias voltage and thereby to prevent the generation of ozone. Concerning the magnet provided in the conveying carrier, different magnetic poles are disposed on both sides of a position where the conveying carrier and the image forming member are most closely located, so that a horizontal magnetic field is formed, and further an oscillating electrical field is formed between the magnetic brush and the image forming member as a bias electrical field. Therefore, the bristles of the magnetic brush are laid in the developing region, so that the charging section is extended, and the magnetic particle chain is not directed to the image forming member. Therefore, dielectric breakdown of the image forming member can be prevented, and stable charging can be uniformly conducted without causing uneven charging.

Next, a preferable embodiment will be described as follows.

Figure 4:
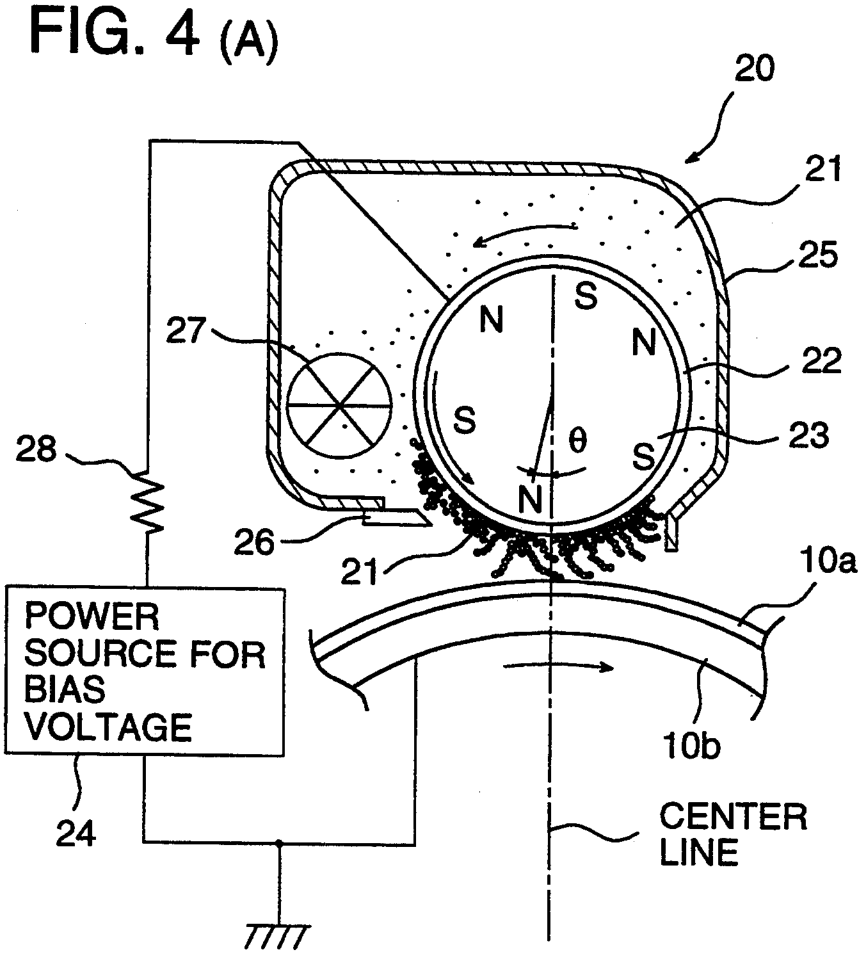
FIG. 4A is a sectional view showing a preferable example of the charging device in FIG. 1.
FIG. 4B is an enlarged view of the preferable example.
Figure 4:
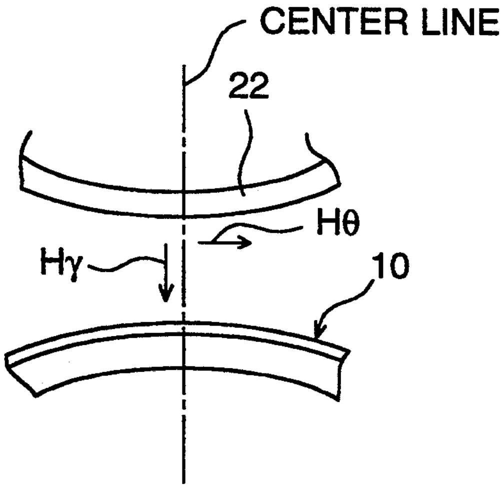

FIGS. 4A and 4B are sectional views showing an example of the charging unit 20 applied to the image forming apparatus illustrated in FIG. 1. In the drawing, numeral 21 denotes magnetic particles, and numeral 22 is a charging roller to convey the magnetic particles 21, which is made of nonmagnetic and conductive metal such as aluminum. Numeral 23 is a pillar-shaped magnet fixedly provided in the charging roller 22. As shown in FIG. 4A, this magnet 23 is composed of N and S poles disposed on the circumference so that the magnetic intensity can be 500–1000 gauss on the surface of the charging roller 22. A magnetic pole disposed closest to the photoreceptor drum 10 will be referred to as a main magnetic pole, hereinafter. The diameter of the charging roller 22 is 5–30 mm$\phi$, and the charging roller 22 is capable of being rotated with respect to the magnet 23. A gap formed between the charging roller 22 and the photoreceptor drum 10 is maintained to be 0.5–1.0 mm, and the charging roller 22 is rotated in the same direction as that of the photoreceptor drum 10 at a circumferential speed 1.2 to 2.0 times as high as that of the photoreceptor drum 10.

The positions of the main magnetic pole of the magnet 23, which is located most closely to the photoreceptor drum 10, is located on the upstream side of the position where the charging roller 22 and the photoreceptor drum 10 are arranged most closely, that is, the main magnetic pole of the magnet 23 is located in the upstream with respect to the rotational direction of the photoreceptor drum 10. As a result of the experiment, the following has been found:

Angle $\theta$ formed between a line connecting the center of the charging roller 22 with the main magnetic pole, and the center line connecting the center of the charging roller 22 with the photoreceptor drum 10, is preferably $5° \leqq \theta \leqq 15°$.

As a result, as shown in FIG. 4B, the magnetic intensity in the charging section is provided with a component of the tangential direction of the circumference of the charging roller 22. When this component of the tangential direction is $H\theta$ and a component of the vertical direction is $H\gamma$, it is preferable that the inequality $H\theta > H\gamma$ is satisfied and the inequality $0.1H\gamma \leqq H\theta \leqq 0.5$ is also satisfied. In this connection, $H\gamma$ is set at 500–1200 gauss.

In this example, the oscillating electric field is formed by impressing an AC bias, and the main pole is disposed being shifted to the upstream side by an angle of 3°–15°, and the magnetic particles are connected so that they can be formed into a chain-shape, and the bristles of the magnetic brush is vertically laid. As a result, the electrical charge injection efficiency of the magnetic brush can be improved, and further the charging section can be extended, so that stable and uniform charging can be conducted at high speed.

After the formation of an image, when the image forming member upon which only an AC component is impressed is rotated, the photoreceptor drum 10 is neutralized. After the photoreceptor drum 10 has been neutralized, the impression of the AC component is stopped, and the magnet 23 is rotated so that the N and S direction of the magnetic pole can be parallel with a tangent of the photoreceptor drum 10 at a position where the photoreceptor drum 10 is opposed to the charging roller 22. Due to the horizontal magnetic field, the bristles of the magnetic brush becomes parallel with the tangent of the photoreceptor drum 10 at a position where the photoreceptor drum 10 is opposed to the charging roller 22. Accordingly, a fore end of the magnetic brush can be separated from the circumferential surface of the photoreceptor drum 10 while the magnetic particles 21 are not deposited on the surface.

According to this example, an image forming apparatus can be provided which is characterized as follows. The main magnetic pole in the conveying carrier is disposed on the upstream side of the rotation of the image forming member, and the oscillating electrical field is formed as a bias electrical field between the magnetic brush and the image forming member. Therefore, the bristles of the magnetic brush are laid in the developing region, so that the charging section is extended, and the magnetic particle chain is not directed to the image forming member. Accordingly, dielectric breakdown of the image forming member can be prevented, and stable charging can be uniformly conducted without causing uneven charging.

Figure 5:
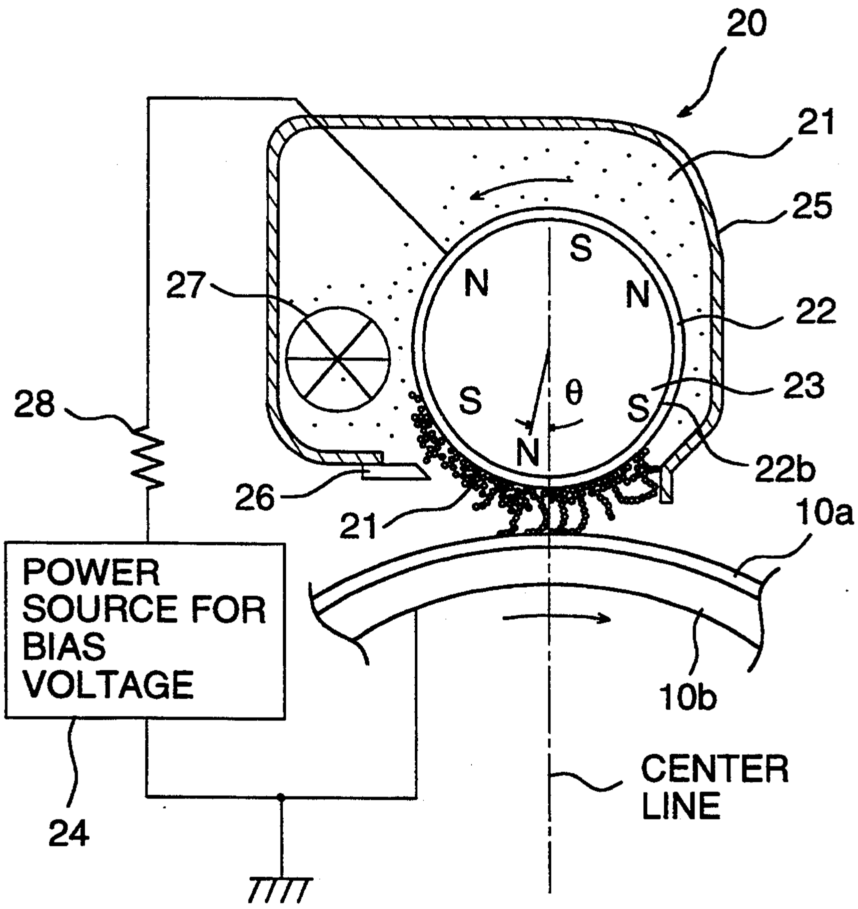
FIG. 5 is a sectional view showing an example of the charging device in FIG. 1.
Figure 6:
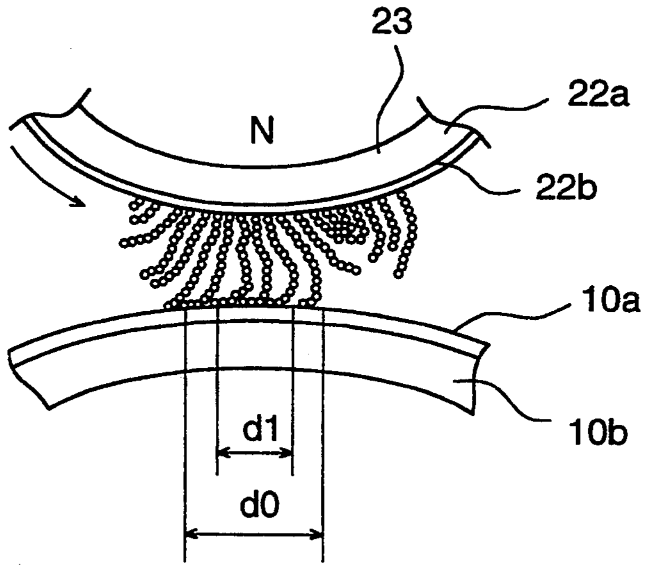
FIG. 6 is a sectional view in which the charging section in FIG. 5 is extended.
Figure 7:
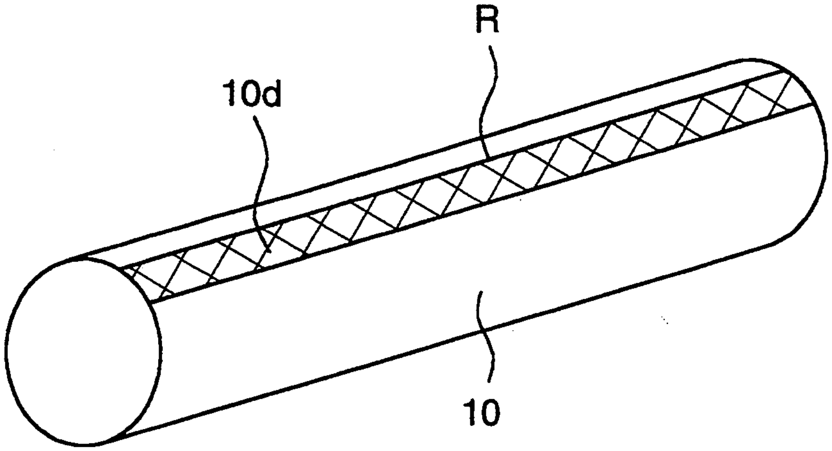
FIG. 7 PRIOR ART
FIG. 7 is a perspective view showing a defective charging portion made by a conventional magnetic brush charging device.

FIGS. 5 is a sectional view showing an example of the charging unit 20 applied to the image forming apparatus illustrated in FIG. 1. FIG. 6 is an enlarged sectional view showing a charging section. In the drawings, numeral 21 denotes magnetic particles. Numeral 22 is a charging roller to convey the magnetic particles 21, which is a cylindrical body made of nonmagnetic and conductive metal such as aluminum, wherein the surface of the charging roller 22 is covered with a high resistance member *22b* made of, for example, binder resin and carbon, the electrical resistivity of which is $10^4$ to $10^{12}$ Ω.cm, and the thickness of which is 20 to 100 μm. Numeral 23 is a pillar-shaped magnet fixedly provided in the charging roller 22. As shown in the drawing, this magnet 23 is composed of N and S poles disposed on the circumference so that the magnetic intensity can be 500–1000 gauss on the surface of the charging roller 22. A magnetic pole disposed closest to the photoreceptor drum 10 will be referred to as a main magnetic pole, hereinafter. The charging roller 22 is capable of being rotated with respect to the magnet 23. A gap formed between the charging roller 22 and the photoreceptor drum 10 is maintained to be 0.5–1.0 mm, and the charging roller 22 is rotated in the same direction as that of the photoreceptor drum 10 at a circumferential speed 1.2 to 2.0 times as high as that of the photoreceptor drum 10.

When the resistance per unit area of the high resistance member *22b* is $\rho s$ ($\Omega/cm^2$) and the resistance per unit area of the magnetic particles is $\rho m$ ($\Omega/cm^2$) under the condition of a magnetic brush, the electrical resistivity of the high resistance member *22b* is determined to be $\rho s=(0.1 \text{ to } 10)\rho m$ at a position where the photoreceptor drum 10 and the charging roller 22 are most closely located.

As a result of an experiment, the following was found: It is preferable that a position of the main pole of the magnet 23, the main magnetic pole being located most closely to the photoreceptor drum 10, is located at the position where the charging roller 22 and the photoreceptor drum 10 are most closely arranged, that is, the main magnetic pole is located close to a center line connecting the center of the photoreceptor drum 10 with that of the charging roller 22, wherein an angle $\theta$ formed between a straight line connecting the center of the charging roller 22 with the main magnetic pole, and the aforementioned center line, is in a range of $-15° \leqq \theta \leqq 15°$. Further, it is preferable that the position of the main pole of the magnet 23 is arranged on the upstream side of conveyance, wherein the value of $\theta$ is positive.

As described above, in this example, the surface of the charging roller 22 is coated with the high resistance member *22b*. Therefore, the resistance between the charging roller 22 including the magnetic brush 21A, and the photoreceptor drum 10 is increased. Accordingly, a region on the photoreceptor drum 10 to be charged by effectively injecting an electrical charge is reduced. In FIG. 6, $d_0$ denotes the width of a conventional charging section in which the high resistance member *22b* is not provided, and $d_1$ denotes the width in the case of the example of the present invention.

According to the example of the present invention, the oscillating electrical field was formed by impressing the AC bias voltage, and the main magnetic pole was provided in a range of 15° on both sides of the position where the two members were most closely located. Therefore, the electrical charge injecting efficiency of the chain-shaped magnetic brush was improved. Further, the conveying carrier for magnetic particles of the charging unit was provided with the high resistance member on the conductive portion. Therefore, the resistance between the conveying carrier including the magnetic brush in the charging section, and the image forming member was increased, and the occurrence of overcurrent was prevented, and the charging section was not extended extremely, and further the occurrence of dielectric breakdown of the image forming member caused by the bias voltage was avoided. Accordingly, an image forming apparatus can be provided, in which stable and uniform charging can be conducted at high speed.

What is claimed is:

1. An image forming apparatus, comprising:
   - a photoreceptor having an imaging surface on which a toner image is formed;
   - a rotatable sleeve disposed to face the photoreceptor with a space therebetween so that a charging section is formed between the photoreceptor and the rotatable sleeve;
   - wherein magnetic particles are arranged to move on the rotatable sleeve according to the rotation of the rotatable sleeve, and are arranged to contact with the photoreceptor;
   - at least two magnetic poles disposed inside of the rotatable sleeve, one of the magnetic poles being arranged so as to be upstream of a closest point between the photoreceptor and the rotatable sleeve, and the other magnetic pole being arranged so as to be downstream of the closest point;
   - an electric power source providing an oscillatory electrical field in the charging section; and
   - wherein the at least two magnetic poles comprise two magnets which are located respectively with angles of 5 to 45 degrees from the closest point.

2. An image forming apparatus, comprising:
   - a photoreceptor having an imaging surface on which a toner image is formed;
   - a rotatable sleeve disposed to face the photoreceptor with a space therebetween so that a charging section is formed between the photoreceptor and the rotatable sleeve;

wherein magnetic particles are arranged to move on the rotatable sleeve according to the rotation of the rotatable sleeve, and are arranged to contact with the photoreceptor;

an electric power source providing an oscillatory electrical field in the charging section;

a magnetic pole disposed inside of the rotatable sleeve and located at an angle of 5 to 15 degrees from the closest point between the photoreceptor and the rotatable sleeve; and when the strength of the magnetic field vertical to a tangent line at the closest point on the sleeve is defined as Hr and the strength of the magnetic field horizontal to the tangent is defined as He, a following relation is satisfied:

$0.1Hr \leqq H\theta \leqq 0.5Hr$.

3. An image forming apparatus, comprising:

a photoreceptor having an imaging surface on which a toner image is formed;

a rotatable sleeve disposed to face the photoreceptor with a space therebetween so that a charging section is formed between the photoreceptor and the rotatable sleeve;

wherein magnetic particles are arranged to move on the rotatable sleeve according to the rotation of the rotatable sleeve, and are arranged to contact with the photoreceptor;

at least two magnetic poles disposed inside of the rotatable sleeve, one of the magnetic poles being arranged so as to be upstream of a closest point between the photoreceptor and the rotatable sleeve, and the other magnetic pole being arranged so as to be downstream of the closest point;

an electric power source providing an oscillatory electrical field in the charging section; and wherein the sleeve includes a conductive member and a high resistance material provided on the conductive member, and when the resistance of the high resistance material is defined as $\rho s$ ($\Omega/cm^2$) and the resistance of the magnetic particles at the closest point is defined as $\rho m$ ($\Omega/cm^2$), a following relation is satisfied:

$\rho s = k \times \rho m$ (k: 0.1 to 10).

4. The apparatus of claim 3, wherein the magnetic particles have an average diameter of 15 $\mu$m to 150 $\mu$m.

5. The apparatus of claim 4, wherein the magnetic particles have an average diameter of 30 $\mu$m to 100 $\mu$m.

6. The apparatus of claim 3, wherein the magnetic particles have a resistance ratio of $10^3$ $\Omega$.cm to $10^{12}$ $\Omega$.cm.

7. The apparatus of claim 6, wherein the magnetic particles have a resistance ratio of $10^3$ $\Omega$.cm to $10^{12}$ $\Omega$.cm.

* * * * *